(12) United States Patent
Reichelt et al.

(10) Patent No.: US 6,295,447 B1
(45) Date of Patent: Sep. 25, 2001

(54) METHOD AND SYSTEM FOR ENABLING THE CONTROL OF EXECUTION OF FEATURES IN A TELECOMMUNICATIONS NETWORK

(75) Inventors: Martin Reichelt, Plano; Jeff Bilger, Arlington, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/224,509

(22) Filed: Dec. 31, 1998

(51) Int. Cl.[7] .............................. H04Q 7/20; H04Q 7/38
(52) U.S. Cl. .................. 455/417; 455/414; 455/413; 455/418; 455/419; 455/422; 455/550; 455/406; 455/421
(58) Field of Search ....................... 455/417, 414, 455/403, 445, 550, 422, 406, 407, 408, 413, 418, 419, 421

(56) References Cited

U.S. PATENT DOCUMENTS 5,966,653 * 10/1999 Joensuu et al. ..................... 455/414
6,055,424 * 4/2000 Tornqvist et al. ................... 455/417
6,131,024 * 10/2000 Boltz ................................... 455/445

* cited by examiner

*Primary Examiner*—William Trost
*Assistant Examiner*—Keith Ferguson
(74) *Attorney, Agent, or Firm*—Jenkens & Gilchrist, P.C.

(57) ABSTRACT

A method and system that enables a subscriber and/or operator to specify one or more conditions under which a given feature such as a supplementary service (SS) is to be executed. When a call event occurs, the relevant telecommunications network evaluates a logical expression that includes variables corresponding to the specified conditions. If (i) the specified conditions are such that the logical expression for the given feature is "TRUE" and (ii) the feature is "ON", then the network executes the given feature and may further perform a specified task related to the executed feature. If (i) the logical expression is not evaluated to "TRUE" or (ii) the feature is not "ON", then the network does not execute the given feature. The network preferably evaluates a logical expression at least for each feature that the subscriber has turned "ON". The method and system is applicable to, for example, the call forwarding, call waiting, multi-party calling, and call barring features. The conditions may include, for example, time, usage, password, and calling party number.

22 Claims, 4 Drawing Sheets

| SUBSCRIPTION INFORMATION (LOGICAL-EXPRESSION-RELATED) | 235 |
|---|---|
| SUPPLEMENTARY SERVICES | 300 |
| *Call Forwarding* | 310 |
| Calling Party Number — 312 | |
| Location — 314 | |
| Time — 316 | |
| Password — 318 | |
| Usage — 320 | |
| Tariff Area — 322 | |
| IP Address — 323 | |
| Called Party Number and Forwarded-To Number — 324 | |
| General Call Forwarding Condition — 326 | |
| . . . — 328 | |
| *Call Waiting* | 330 |
| *Call Barring* | 340 |
| *Multi-Party Calling* | 350 |
| *General Supplementary Service* | 360 |
| *. . .* | 370 |

*FIG. 3*

{NOT [ (A AND B OR C) AND D] AND [E OR F] } AND (ON) ---> EXECUTE FEATURE — 400

*FIG. 4A*

METHOD AND SYSTEM FOR ENABLING THE CONTROL OF EXECUTION OF FEATURES IN A TELECOMMUNICATIONS NETWORK

DESCRIPTION OF RELATED ART

Mobile wireless communication is becoming increasingly important for providing safety, convenience, improved productivity, and simple conversational pleasure to subscribers of wireless communications services. One prominent mobile wireless communication option is cellular communication. Cellular phones, for instance, can be found in cars, briefcases, purses, and even pockets. With the proliferation of cellular phone use, cellular phone subscribers are clamoring for new features. However, for cellular phone system providers to offer cellular phone subscribers new services, cellular wireless networks must typically be adapted (e.g., modified or augmented) before subscribers are given access to new and/or expanded services.

Referring now to FIG. 1 of the drawings, an exemplary cellular wireless network, such as a Global System for Mobile Communication (GSM) Public Land Mobile Network (PLMN) 100, will be described. The PLMN 100 is composed of a plurality of areas 105, each with a Mobile Services Switching Center (MSC) 110 and an integrated Visitor Location Register (VLR) 115 therein. The MSC/VLR areas 105, in turn, include a plurality of Location Areas (LA) 120, which are defined as that part of a given MSC/VLR area 105 in which a Mobile Station (MS) (terminal) 125 may move freely without having to send update location information to the MSC/VLR 110 that controls the LA 120. Each LA 120 is divided into a number of cells 130. The MS 125 is the physical equipment, e.g., a car phone, a computer with a wireless link, or other portable phone, used by mobile subscribers to communicate with the cellular network 100, each other, and users outside the subscribed network, both wireline and wireless.

The MSC 110 is in communication with at least one Base Station Controller (BSC) 135, which, in turn, is in contact with at least one Base Transceiver Station (BTS) 140. The BTS 140 is the physical equipment, illustrated for simplicity as a radio tower, that provides radio coverage to the geographical part of the cell 130 for which it is responsible. It should be understood that the BSC 135 may be connected to several base transceiver stations 140, and may be implemented as a stand-alone node or integrated with the MSC 110. In either event, the BSC 135 and the BTS 140 components, as a whole, are generally referred to as a Base Station System (BSS) 145.

With further reference to FIG. 1, the PLMN Service Area or wireless network 100 includes a Home Location Register (HLR) 150, which is a database maintaining all subscriber information, e.g., user profiles, current location information, International Mobile Subscriber Identity (IMSI) numbers, and other administrative information. The HLR 150 may be co-located with a given MSC 110, integrated with the MSC 110, or alternatively can service multiple MSCs 110, the latter of which is illustrated in FIG. 1.

The VLR 115 is a database containing information about all of the Mobile Stations 125 currently located within the MSC/VLR area 105. If an MS 125 roams into a new MSC/VLR area 105, the VLR 115 connected to that MSC 110 will request data about that MS 125 from the HLR database 150 (simultaneously informing the HLR 150 about the current location of the MS 125). Accordingly, if the user of the MS 125 then wants to make a call, the local VLR 115 will have the requisite identification information without having to reinterrogate the HLR 150. In the aforedescribed manner, the VLR and HLR databases 115 and 150, respectively, contain various subscriber information associated with a given MS 125.

Increasingly, mobile service subscribers are using their MS 125 as much as, or even more than, a traditional wireline phone. As a result, wireless service subscribers are demanding value-added features from their wireless communication systems providers. Examples of such features include voice mail, call forwarding, call waiting, call barring, and multi-party calling services. Existing wireless communication systems, however, are deficient inasmuch as such systems only offer subscribers the ability to turn any available service either on or off. The service options heretofore available cannot be configured or tailored further according to a subscriber's desires or needs.

Because the competition between telecommunication providers is increasing at a rapid pace, network operators are looking for new and innovative services which will distinguish their network from the ones of their competitors. The present invention provides flexible and innovative features that today's customers expect and demand by providing a common framework for configurable features.

SUMMARY OF THE INVENTION

The deficiencies of the prior art are overcome by the method and system of the present invention. For example, as heretofore unrecognized, it would be beneficial if subscribers could tailor a feature as desired, instead of merely being able to turn a feature option on or off. In fact, it would be beneficial if subscribers could specify one or more conditions such that when an associated logical expression is evaluated to "TRUE", a specified action of a given feature is undertaken.

The present invention achieves these beneficial objectives with a method and system in which a subscriber may subscribe to one or more (e.g., a set of) features (e.g., such as SSs) with a telecommunications provider (e.g., a wireless service provider). The subscriber may turn "ON" all or a subset of the total set of features. In this context, turning a feature "ON" implies that the feature is ready to be executed. Additionally, in accordance with the present invention, the subscriber may specify one or more parameters (e.g., conditions) under which a given feature is to be executed. When a call event occurs, the relevant telecommunications network evaluates a logical expression that includes variables corresponding to each of the specified conditions.

If (i) the specified conditions (regardless of whether the number of specified conditions is one, ten, etc.) are such that the logical expression for the given feature is "TRUE" and (ii) the feature is "ON", then the network executes the feature and may further perform a specified task related to the executed feature. If (i) one or more of the specified conditions are such that the logical expression is not "TRUE" or (ii) the given feature is not "ON", then the network does not execute the feature. The network preferably evaluates a logical expression at least for each feature to which the subscriber has subscribed and that the subscriber has turned "ON". In an alternative embodiment, the network evaluates a logical expression directed toward specified conditions only after determining that a given feature is turned "ON".

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein:

FIG. 3 illustrates exemplary subscriber subscription information in accordance with the present invention;

FIG. 4A illustrates an exemplary general logical expression in accordance with the present invention;

DETAILED DESCRIPTION OF THE DRAWINGS

Figure 1:
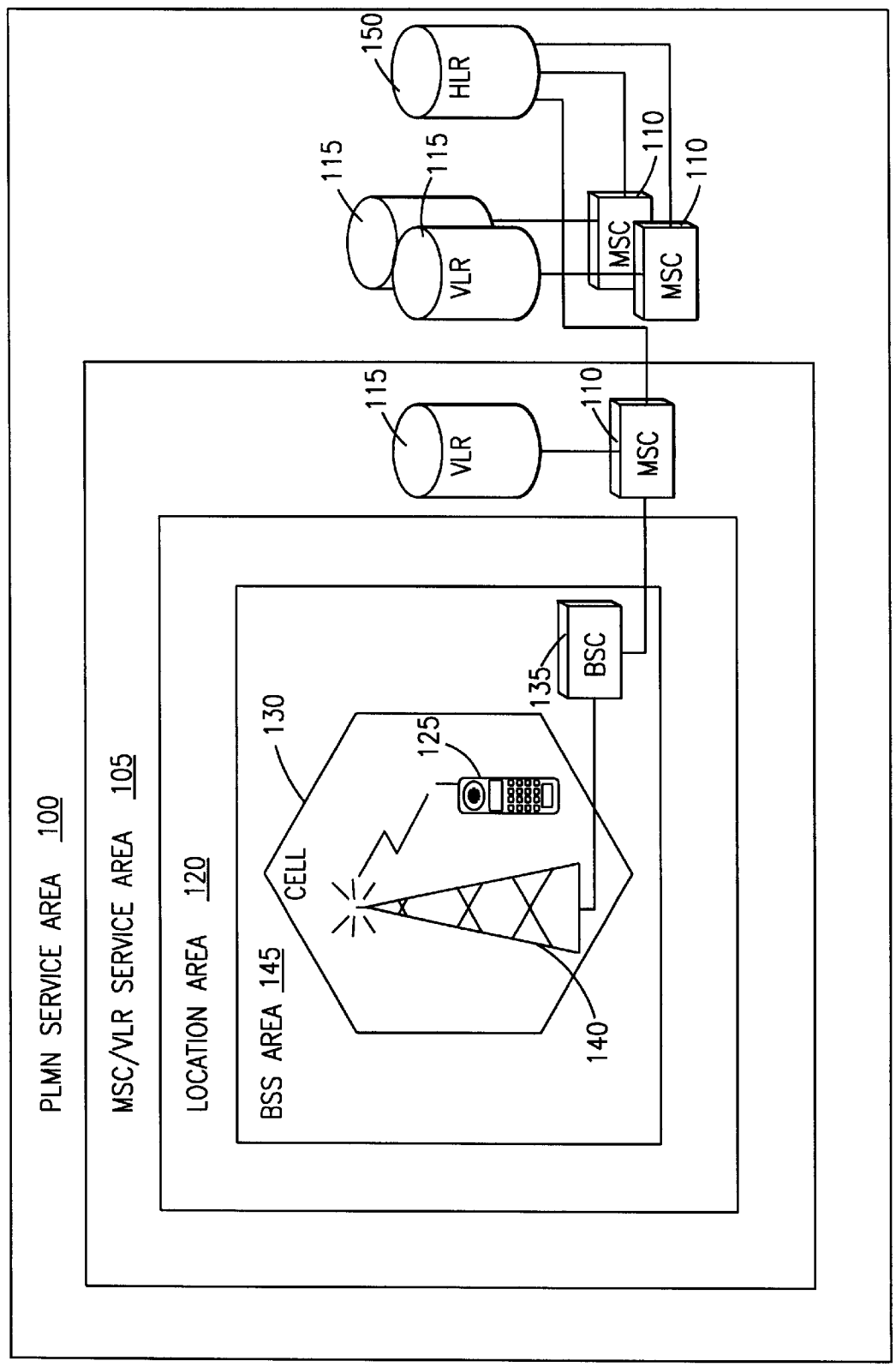
FIG. 1 illustrates an exemplary cellular wireless network in which the present invention may be practiced.

In the following description, for purposes of explanation and not limitation, specific details are set forth, such as particular networks, network components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and software techniques are omitted so as not to obscure the description of the present invention with unnecessary detail.

A preferred embodiment of the present invention and its advantages are best understood by referring to FIGS. 1–5 of the drawings, like numerals being used for like and corresponding parts of the various drawings.

Aspects of the Global System for Mobile Communications (GSM) will be used to describe a preferred embodiment of the present invention. However, it should be understood that the principles of the present invention are applicable to other communication standards (or systems, both wireless and wireline), especially those in which a user may subscribe to special features such as call forwarding and call barring.

Extended Features

The present invention is directed, at least in part, to an enhancement of existing features as well as forthcoming features. Features may include, but are not limited to, SSs as well as other services. The present invention enables the invocation of the feature to be dependent on subscriber and/or operator defined conditions. Based on a given set of conditions, the subscriber and/or operator may define one or more logical expressions that, when evaluated to TRUE, trigger the execution of the feature with the specified action.

Many conditions for forming the given set of conditions are possible, such as the following exemplary conditions:

Calling party number (CPN): One or more CPNs may be specified, with or without wildcards. For example, using wildcards all numbers of one telephone area code may be specified (e.g., "972-\*\*\*-\*\*\*\*"). The case CPN 'not available' may be treated as a separate condition.

Location: One or more logical locations (e.g., an area code) or geographical locations (e.g., a world zone, a country code, or another small geographical code such as a state or county code) may be specified, with or without wildcards. The location may be identified independently of the number of the MS and based on the exact or approximate physical location of the MS. The wild card option, for example, may use "4\*" for a country code location specification that is desired to include all countries in world zone 4 (e.g., Sweden ("46"), Germany ("49"), etc.)

Time: One or more time intervals may be specified (e.g., from 6:00 PM to 8:00 AM and/or Monday–Friday from 12:00 noon to 1:00 PM)

Password: One or more passwords may be specified per expression in an exemplary embodiment (e.g., a four-digit code such as "1234").

Usage: A time or cost quota may be specified (e.g., a maximum of $50.00 in total expenditures). Alternatively or additionally, a data volume quota may be specified (e.g., a set size and/or number of datagrams/packets received and/or transmitted).

Tariff area: One or more Tariff areas may be specified (e.g., downtown areas may be high cost, suburban areas may be medium cost, and rural areas may be low cost). A subscriber may specify, for example, that only calls from a spouse are received in high cost tariff areas, that calls from several different calling party numbers are put through in medium cost tariff areas, and that all calls are allowed in low cost tariff areas. The tariff area is a condition that is currently GSM specific, but it may be applicable to other standards/systems in the future.

Internet Protocol (IP) address: One or more IP addresses (e.g., host address, domain, sub-domain, etc.) may be specified.

Called party number (e.g., the B number) and the forwarded-to number (e.g., the C number or the number to which a call is forwarded): One or more called party numbers and/or forwarded-to numbers may be specified, with or without wildcards, in a manner similar to the CPN condition.

These conditions related to a common extended features framework are applicable, but not limited, to the following features: call waiting, call forwarding, call barring, and multi-party calling. In a GSM network, the framework that allows the definition of the enhanced features may be implemented in the traditional network nodes (e.g., a gateway MSC (GMSC), an HLR, an MSC, a node associated with the General Packet Radio Service (GPRS), an Internet Point-of-Presence (INET-POP), etc.) with an optional interworking of Intelligent Network (IN) nodes.

Figure 2:
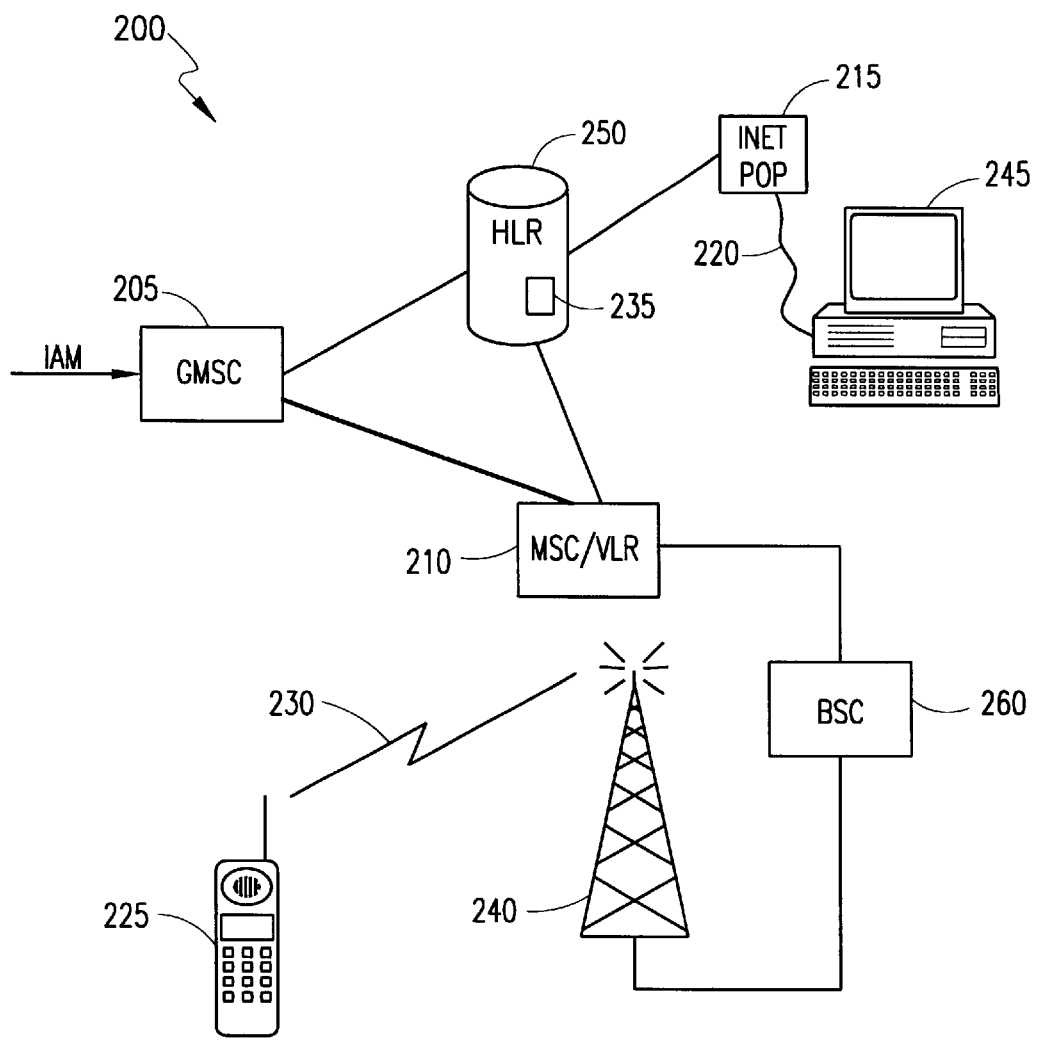
FIG. 2 illustrates aspects of an exemplary cellular wireless network in accordance with the present invention.

With reference now to FIG. 2, aspects of an exemplary cellular wireless network in accordance with the present invention are illustrated generally at 200. A GMSC 205 is connected to an HLR 250 an MSC/VLR 210. The HLR 250 is connected to an INET-POP 215 and the MSC/VLR 210, and the MSC/VLR 210 is connected to a BSC 260, which is connected to a BTS 240. Also illustrated are an MS 225 and a computing device 245. It should be noted that the present invention is equally applicable to a wireline telecommunications network in which the communication station of the subscriber is a wireline telephone. The subscriber (not pictured) sets (e.g., establishes) conditions precedent for the execution of a given feature by informing the wireless network 200. The conditions are preferably stored at the HLR 250 in subscription information 235, but other storage locations and data files are contemplated to be within the scope of the present invention. The subscriber may inform the wireless network 200 of the desired conditions in any one (or combination) of a myriad of fashions.

For example, the user interface to define/specify the conditions related to an extended features framework may be realized using Unstructured Supplementary Service Data (USSD) procedures of the GSM standard from the MS 225 of the subscriber. Descriptions of the USSD provisions may be found in, for example, the ETSI/GSM-TS (e.g., GSM 03.90 (Stage 2)). The features may be managed (e.g., selected, deselected, options thereof established or changed, etc.) in accordance with the principles of the present invention by entering text strings that are sent to the wireless network from the MS 225 via the wireless link 230. For example, USSD text strings may be entered in the form "dXc#", where "d"=1, 2, or 3 characters of the set {*,#}, "X"=service code that identifies the USSD application, and "c"="*" plus 1–10 digits (c is optional). Thus, a USSD application, in accordance with the present invention, uses an interface program that communicates with the subscriber and asks for the specification of the parameters (variables) for, e.g., the CF on PW feature. If the service code for this USSD application is "582", then to setup the interface to define one or more logical expressions related to this feature, the subscriber dials "*582#", where "*" corresponds to "d" and "582" corresponds to the service code of the USSD application. A dialogue between the MS 225 and the USSD application may then be setup so that the subscriber may configure one or more logical expressions related to the feature. Preferably, however, the MS 225 provides a more user-friendly method (e.g., a menu-prompted ability) to manage the various conditions for the features.

As an additional example, the subscriber may be provided the ability to access his or her account remotely by, for example, a computer, personal digital assistant, etc. (e.g., via a wireline or wireless Internet connection 220 using the computing device 245 loaded with appropriately-secure software such as an encryption-capable Internet browser). A relatively large-screen, visual interface provides an excellent mechanism for setting the various conditions precedent to executing features that are available to subscribers. Subscribers are advantageously provided the ability to set, review, and modify the available conditions simultaneously. Furthermore, a company that owns many MSs (e.g., 200 or more) may use this interface to access their accounts remotely either one at a time or as a set. Hence, the company may set conditions for one MS at a time, 20 MSs at a time, 45 MSs at a time, 200 MSs at a time, etc. This simplifies the administration of a large set of MSs and is therefore more efficient for the customer. It should be understood that the invention is not to be limited, however, by the manner in which the various conditions are set.

With reference now to FIG. 3, exemplary subscriber subscription information in accordance with the present invention is illustrated. The subscription information 235 (of FIG. 2) may be a novel part of conventional subscriber data/information stored in the HLR 250 or may be, for example, a separate data structure linked to the subscriber data/information in some manner. It should be understood that the subscription information 235, at least as shown in FIG. 3, includes logical-expression-related information, but it may include additional information as well. Regardless of specific implementation, the subscription information 235 includes (e.g., has as part of the subscription information 235 file, is linked by a pointer to, etc.) one or more entries for the SSs 300 information. It should be understood that the subscription information may contain entries for any general current or future feature as well, but SSs are used in this example without limitation. The SSs 300 information includes multiple SSs (or, e.g., services, features, etc. in general) such as call forwarding (CF) 310, call waiting (CW) 330, call barring (CB) 340, multi-party calling (MPTY) 350, a general SS 360, and an additional, unspecified service 370. The additional, unspecified service 370 indicates that the enumerated services are nonexclusive and that the present invention is not to be so limited.

The CF SS 310 is shown to include multiple conditions. The conditions include CPN 312, location 314, time 316, password (PW) 318, usage 320, tariff area 322, IP address 323, called party number and forwarded-to number 324, a general CF condition 326, and an additional, unspecified condition 328. The additional, unspecified condition 328 indicates that the enumerated conditions for the CF SS 310 are nonexclusive and that the present invention is not to be so limited. It should be understood that the CW SS 330, the CB SS 340, the MPTY SS 350, the general SS 360, and the additional, unspecified service 370 may also include any of the conditions under the CF SS 310 as well as other conditions, as explained in greater detail hereinbelow.

The subscription information 235 may be set, altered, and/or canceled, etc. by a subscriber in accordance with the present invention as explained further hereinbelow by way of example. After the subscriber has established one or more conditioned features, the wireless network 200 (of FIG. 2) refers to the subscription information 235 when a call event occurs (e.g., an incoming call is detected at the GMSC 205 by the reception of an Initial Address Message (IAM), a call is initiated by the subscriber at the MS 225, etc.). The wireless network evaluates a logical expression to determine whether a feature that has been turned on by the subscriber should be executed with respect to, for example, a call event that is an incoming call.

For one exemplary embodiment, the subscription information 235 (of FIG. 3) is shown in list form in order to clearly convey the various possible conditions. However, the various conditions for each feature are not stored separately in list form for this exemplary embodiment. Each condition for each feature is stored in (e.g., partial or whole) logical expression form in order to, for example, expedite the evaluation process in the network. Furthermore, in this embodiment, the preference(s) of the subscriber, operator, etc. may be sent to the network already in the form of the partial or complete logical expression to be evaluated.

With reference now to FIG. 4A, an exemplary general logical expression in accordance with the present invention is illustrated. Logical expression 400 is a symbolic representation of an exemplary general logical expression that the wireless network 200 evaluates. The logical expression varies (including the parenthetical groupings) depending on the specifications of the subscriber. The expression may be evaluated in any appropriate node. For example, if the conditioned feature is dependent on whether the subscriber is currently on the phone (e.g., the CW SS), the MSC/VLR 210 may be an optimal physical location to evaluate the expression, which is passed to the MSC/VLR 210 from the HLR 250 (either in a form prepared for evaluation or "merely" with a listing of the conditions (entries) under CW 330). It should be noted that relevant information may be transmitted and requisite communications may be established between nodes using conventional signaling (e.g., Mobile Application Part (MAP) components such as Send Routing Information (SRI) messages between the GMSC 205 and the HLR 250 and Provide Roaming Number (PRN) messages between the HLR 250 and the MSC/VLR 210). As another example, if the HLR 250 stores the subscription information 235 and is in possession of all relevant variables, then the HLR 250 may be the optimal location in the wireless network 200 for evaluating the logical expression 400.

The exemplary logical expression 400 includes six (6) conditions (e.g., "A", "B", "C", "D", "E", and "F"). The number of conditions, it should be understood, may be either less than, equal to, or more than six. It should also be understood that each condition (e.g., "B") may be replaced by the unary operator (e.g., the "NOT" operator) in conjunction with the condition (e.g., "UNARY OPERATOR B"), where the "UNARY OPERATOR" is optional. The wireless network 200 determines the status of as many conditions as are necessary to evaluate the logical expression. The wireless network 200 then evaluates the overall logical expression (e.g., the exemplary logical expression 400) to determine whether or not it is "TRUE". If the logical expression is "TRUE" (i.e., "{NOT[(A AND B OR C) AND D] AND [E OR F]}" is "TRUE") and the relevant feature is "ON" (e.g., the subscriber has elected to turn on the feature), the wireless network 200 executes the relevant feature. The wireless network 200 evaluates such a logical expression 400 (either sequentially or in parallel) for each feature to which the subscriber subscribes. The present invention is further explained hereinbelow using a CF SS as an example.

Extended Call Forwarding

In conventional systems, there exists several service options of CF. Some examples are 'Unconditional CF', 'CF on No Reply', and in mobile telephony 'CF on Not Reachable'. However, these CF services cannot be contoured further according to a subscriber's desires or needs. In other words, each of these types of CF services are either "ON" or "OFF". The present invention provides an enhancement to the existing CF services. It enables the invocation of the CF service to be dependent on both subscriber and/or operator defined conditions. Based on a given set of conditions, the subscriber and/or operator may define one or more logical expressions that, when evaluated to "TRUE", trigger the execution of the CF service with the specified action.

Many conditions that are applicable to CF for forming the given set of conditions are possible, such as the following exemplary conditions:

CPN: One or more CPNs may be specified, with or without wildcards. For example, using wildcards all numbers of one telephone area code may be specified (e.g., "972-*-**") The case CPN 'not available' may be treated as a separate condition.

Location: One or more logical locations (e.g., an area code) or geographical locations (e.g., a world zone, a country code, or another small geographical code such as a state or county code) may be specified, with or without wildcards. The location may be identified independently of the number of the MS and based on the exact or approximate physical location of the MS. The wild card option, for example, may use "4*" for a country code location specification that is desired to include more than only the country code for Sweden, which is "46 ".

Time: One or more time intervals may be specified (e.g., from 6:00 PM to 8:00 AM and/or Monday–Friday from 12:00 noon to 1:00 PM).

Password: One or more passwords may be specified per expression in an exemplary embodiment (e.g., a four-digit code such as "1234").

Usage: A time or cost quota may be specified (e.g., a maximum of $50.00 in total expenditures). Alternatively or additionally, a data volume quota may be specified (e.g., a set size and/or number of datagrams/packets received and/or transmitted).

Tariff area: One or more Tariff areas may be specified (e.g., downtown areas may be high cost, suburban areas may be medium cost, and rural areas may be low cost). A subscriber may specify, for example, that only calls from a spouse are received in high cost tariff areas, that calls from several different calling party numbers are put through in medium cost tariff areas, and that all calls are allowed in low cost tariff areas. The tariff area is a condition that is currently GSM specific, but it may be applicable to other standards/systems in the future.

IP address: One or more IP addresses (e.g., host address, domain, sub-domain, etc.) may be specified.

Called party number (e.g., the B number) and the forwarded-to number (e.g., the C number or the number to which a call is forwarded): One or more called party numbers and/or forwarded-to numbers may be specified, with or without wildcards, in a manner similar to the CPN condition.

Some exemplary applications of the extended CF service are explained below:

(1) 'CF on Password' may be defined by 'subscriber B' such that a 'person A' calling the 'subscriber B' may enter a PW. If the entered PW matches one of the 'PWi's specified, then the call is forwarded to 'Number Ci'; otherwise, the call may be forwarded to 'Number Cn', an announcement may be played, or the call may be routed to voice mail.

Exemplary benefits of CF on PW are as follows: (1a) It allows only selected people (e.g., those who know the PW) to reach 'subscriber B'. (1b) It allows 'subscriber B' to have a dynamic distribution of his/her incoming calls without disclosing all numbers and/or having to keep everyone updated when and as a phone number changes. An example for such a dynamic distribution-list is provided hereinbelow at Table 1. (1c) It allows an operator, newspapers, etc. to "rent out" phone numbers to customers who want to post a telephone number under which they are reachable without disclosing their private telephone number. For example, Bob Brown wants to sell his car and rents the number (972) 555-9999 with the PW "1111". As long as he rents the number, the CF on PW to his home/mobile/work phone number will be in effect. The same number may also be "rented out" to other customers at the same time with different PWs, thereby producing extra revenue.

TABLE 1

EXEMPLARY DYNAMIC DISTRIBUTION LIST (972) 555-1234 + no PW ----> home
(972) 555-1234 + PW 1 ----> [CF to] mobile phone
(972) 555-1234 + PW 2 ----> [CF to] work
(972) 555-1234 + PW 3 ---->
[CF to] mobile phone spouse
(972) 555-1234 + PW 4 ----> [CF to] . . .
(972) 555-1234 + unmatched PW ----> voice mail (2) 'CF on CPN' may be defined by 'subscriber B' such that the call from a 'person A' to the 'subscriber B' is treated based on the result of the Line Identification. If the calling number matches, the call is forwarded to 'Number Ci', otherwise to 'Number Cn'. For example, Pam Brown takes her mobile phone from Dallas, Tex., to Raleigh, N.C., and wants to be reached by people from work (e.g., (972)

583-xxxx), from all over NC (e.g., (910) xxx-xxxx), and by her husband (e.g., (214) 999-1234). All other calls are set to be forwarded to her home phone.

(3) 'CF on Usage' enables, for example, a person that is traveling to have calls to his/her home phone to be forwarded to a mobile phone as long as the total charges for the forwarding is less than a certain dollar amount (e.g., $50.00). After that preset limit is exceeded, calls to the home phone are forwarded to the voice mail of the subscriber's wireless service. Additionally, certain numbers may be stipulated as to be forwarded independently of the charges.

An exemplary embodiment of the present invention is described in the context of a specific CF example. In this example, a wireless service subscriber decides to turn on CF with two conditions precedent for the execution of the CF SS. The subscriber wishes to have incoming calls forwarded to his/her work number, but only if (i) the call is received between the hours of 9:00 AM and 5:00 PM and (ii) the calling party knows the appropriate PW (e.g., he/she only wishes to be interrupted at work by immediate family members that have been given the PW). In other words, two conditions precedent to the execution of the CF SS are desired. The subscriber may also specify, for example, that other incoming calls during these hours are directed to voice mail associated with the wireless subscription. It should be noted that conditions may also be established under the direction of others, such as the operator of the wireless system, for example.

Figure 5:
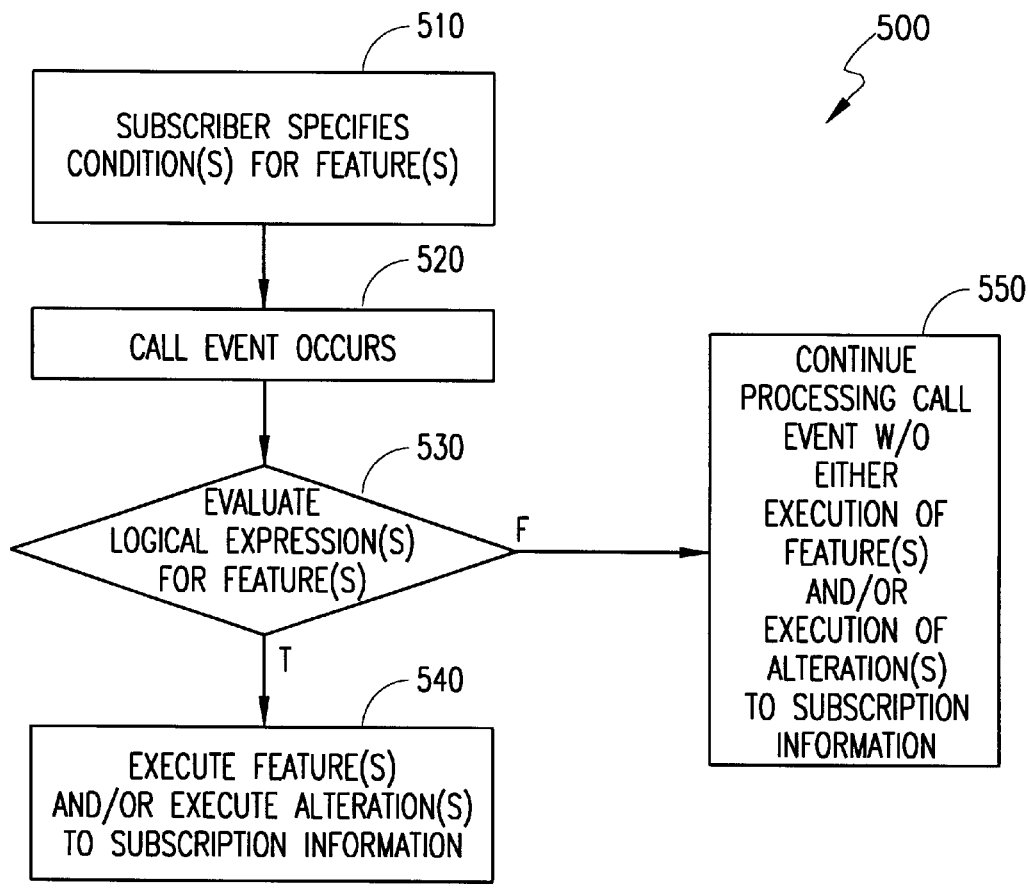
FIG. 5 illustrates a method in flowchart form for executing a feature based on an evaluation of a logical expression in accordance with the present invention.

With reference now to FIG. 5, a method in flowchart form for executing a feature based on an evaluation of a logical expression in accordance with the present invention is illustrated. Continuing with the above-defined example, the subscriber specifies the two conditions for executing the CF SS (in addition to turning the service "ON", if necessary) (step 510 of flowchart 500). The subscriber may communicate these conditions via, for example, a USSD-based wireless transmission 230 (of FIG. 2) using menus on the MS 225, an Internet-based connection 220 using the remote computing device 245, etc. (It should be understood that the remote computing connection aspect of the present invention is not limited to being Internet-based.) The subscriber thus also communicates, and the network may receive and/or deduce, the interrelationship (e.g., a logical expression) between and/or among the conditions. The HLR 250 may store the two conditions in the subscription information 235 under the CF SS entry 310 at the time condition entry 316 and at the PW condition entry 318. The HLR 250 may also store the relevant logical expression(s) in the subscription information 235 (e.g., explicitly as a separate logical expression(s) entry or entries (not illustrated) with each of the relevant conditions amalgamated into the separate logical expression(s), implicitly as the sum of each of the relevant conditions in their individual entries, etc.). A call event occurs and is detected by the wireless network 200 (e.g., the IAM is received at the GMSC 205) (step 520).

Figure 4B:
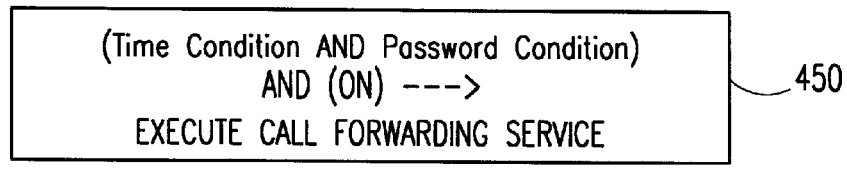
FIG. 4B illustrates an exemplary specific logical expression in accordance with the present invention.

Referring now to FIG. 4B, an exemplary specific logical expression in accordance with the present invention is illustrated. Logical expression 450 represents the logical expression that the wireless network 200 evaluates after the subscriber establishes the two conditions for the CF SS in accordance with the current example. In the current example (assuming that no other features are "ON"), the HLR 250 may evaluate the logical expression because it is able to observe the actual time and to compare any observed (e.g., received) PW to the stored PW in PW condition entry 318 as well as compare the actual time to the stored times in the time condition entry 316. The HLR 250 evaluates the logical expression 450 for at least one feature (step 530). The wireless network 200 may proceed to evaluate all features to which the subscriber subscribes while tallying the results of each such evaluation before continuing with executing the flowchart 500.

Continuing now with FIG. 5, under the current example, the CF SS is "ON". If (i) the incoming call is received between 9:00 AM and 5:00 PM and (ii) a matching PW is received, then the logical expression 450 is evaluated as "TRUE" (at step 530). If evaluated to "TRUE", the wireless network 200 executes the CF SS (step 540) and forwards the incoming call to the subscriber's office phone number. If the wireless network 200 has tallied more than one feature as "TRUE" (in step 530); then the wireless network 200 may execute each such feature. In order to execute multiple features, the prioritizations stipulated in the GSM specification (e.g., the defined interactions between and among various features that are simultaneously in effect) may be utilized for GSM-based systems when more than one feature is tallied while evaluating logical expressions (in step 530). Also, if the evaluation of a logical expression is to cause alteration(s) of the subscription information (e.g., modify, inhibit, turn "ON", etc. a feature), then such alteration(s) may be effectuated here as well (See hereinbelow for a description of alteration of subscription information.).

If either (i) the incoming call is not received between 9:00 AM and 5:00 PM or (ii) a matching PW is not received, then the logical expression 450 is evaluated as "FALSE" (at step 530). If evaluated to "FALSE", the wireless network 200 continues processing the call event and does not execute the CF SS (step 550). In other words, unless another extended SS (or any general feature) is in effect, the wireless network 200 rings the MS 225. If the wireless network 200 has tallied any feature as "TRUE" (in step 530), then the wireless network 200 may execute each such feature (e.g., be executing step 540) in accordances for example, with the defined interactions.

The subscriber is therefore able to specify a myriad of conditions precedent for executing multiple features and for causing each feature to perform a specified action upon execution (optionally based on the established conditions as compared to observed actual conditions). The subscriber may therefore tailor the wireless service to individual needs as those needs develop and change. Examples of selective other features are described below with appropriate illuminating examples. It should be understood that the selected features and the corresponding examples are illustrative and should not be considered as limiting the present invention.

Extended Call Waiting

If a customer of a wireless network service has subscribed to the CW service, the feature can either be turned "ON" or not. When the CW service is turned "ON", and the subscriber is on the phone (e.g., such as the MS 225), every additional incoming call will cause the CW indication to be triggered. The CW service cannot be configured further according to a subscriber's desires or needs. The present invention provides an enhancement to the existing CW service. It enables the invocation of the CW service to be dependent on both subscriber and/or operator defined conditions.

Based on a given set of conditions, the subscriber and/or operator may define one or more logical expressions that, when evaluated to "TRUE", trigger the execution of the CW service with the specified action. Many conditions that are applicable to CW for forming the given set of conditions are possible, such as the following exemplary conditions: CPN, location, time, PW, usage, and tariff area. These conditions are explained hereinabove.

Some exemplary applications of the extended CW service are explained below:

(1) 'CW on Password' may be defined by 'subscriber B' such that a 'person A' calling the 'subscriber B' may enter a PW. If the 'subscriber B' is using the phone and if the entered PW matches the one specified, a CW indication is produced towards 'subscriber B'. This may be useful, for example, in cases in which 'subscriber B' uses the phone line to dial up to an Internet Service Provider (ISP), but he/she still wants to be able to receive calls from certain people.

(2) 'CW on Calling Party Number' may be defined for a set of numbers corresponding to 'preferred' callers. Therefore, except for this 'preferred' group of people, no one is able to interrupt an ongoing call.

(3) 'CW on Called Party Number' may be defined for one or a set of numbers for which CW is inhibited during the duration of calls to such a number or set of numbers. For example, a subscriber may want to inhibit all CW features during calls to an ISP. In effect, the CW feature may thus be modified in accordance with the evaluation of the logical expression. This aspect of the present invention is addressed further hereinbelow under "Alteration of Subscription Information." It should be noted that specifying (1) and (3) simultaneously may result in conflict(s).

Extended Multi-Party Calling

In conventional GSM systems, the MPTY service only allows a conference call to be setup after a subscriber is in the speech state. The present invention provides an enhancement to the existing MPTY service. It enables the invocation of the MPTY service to be dependent on both subscriber and/or operator defined conditions. Based on a given set of conditions, the subscriber and/or operator may define one or more logical expressions that, when evaluated to "TRUE", trigger the execution of the MPTY service with the specified action.

Many conditions that are applicable to MPTY for forming the given set of conditions are possible, such as the following exemplary conditions that are applicable to both an incoming call and an outgoing call: CPN, location, time, PW, and usage. Additional exemplary conditions applicable to an outgoing call are: called party number and forwarded-to number. These conditions are explained hereinabove.

Some exemplary applications of the extended MPTY service are explained below:

(1) Conference calls may easily be set up by using incoming MPTY by CPN with or without a PW and/or time condition. In this case, when the call is received, the MPTY service is used to ring a predefined set of numbers. Consequently, a conference call is set up by simply dialing one number.

(2) In example (1), the conference call may also be set up using outgoing MPTY by called party number/forwarded-to number with or without a PW and/or time feature (e.g., condition).

(3) If a customer (e.g., subscriber) wishes to record all of his/her phone conversations that originate from certain CPNs, then he/she may use the incoming MPTY by CPN feature. In this case, when the call is received, the MPTY service is used to ring both the customer and the recording mechanism.

(4) If a customer wishes to record all of his/her phone conversations that are received after a certain time (e.g., after midnight), then he/she may use the incoming MPTY by time feature. In this case, when the call is received, the MPTY service is used to ring both the customer and the recording mechanism.

(5) In example (3), the customer may further qualify the invocation of the MPTY service by using time as a condition as well.

(6) In order to facilitate the setup of MPTY calls, a certain group of numbers may be associated with a PW. Thus, when an outgoing call with PW occurs, this call event may trigger the outgoing MPTY feature that sets up a MPTY call using a predefined set of numbers associated with the PW. An example of such a predefined set of numbers is provided in Table 2.

TABLE 2

EXEMPLARY (PW-LINKED) MPTY PHONE LIST (972) 527-1234 + PW1 ---> [MPTY to]
(972) 527-1000, (214) 999-9596, . . .
(972) 527-1234 + PW2 ---> [MPTY to]
(214) 555-1212, (817) 555-8550, . . .

(7) In order to avoid using a PW in a PBX, an empty extension may be used to define the set of numbers for the multi-party call. An example for such a predefined set of numbers is provided in Table 3.

TABLE 3

EXEMPLARY (FOR PBX) MPTY PHONE LIST 527-9977 + 5000 ---> [MPTY to] 527-1000,
527-9596, . . .
527-9977 + 5001 ---> [MPTY to] 527-1212,
527-1000, . . .

Extended Call Barring

In conventional GSM systems, some of the different CB service options are: 'Call Barring of All Outgoing Calls', 'Call Barring of All Outgoing International Calls', 'Call Barring of All Outgoing International Calls except towards Home PLMN Country', 'Call Barring of All Incoming Calls', and 'Call Barring of Incoming Calls while Roaming outside Home PLMN'. However, these CB services cannot be contoured further according to a subscriber's desires or needs. In other words, each of these types of CB services are either "ON" or "OFF". The present invention provides an enhancement to the existing CB services. It enables the invocation of the CB service to be dependent on both subscriber and/or operator defined conditions.

Based on a given set of conditions, the subscriber and/or operator may define one or more logical expressions that, when evaluated to "TRUE", trigger the execution of the CB service with the specified action. Many conditions that are applicable to CB for forming the given set of conditions are possible, such as the following exemplary conditions that are applicable to both an incoming call and an outgoing call: CPN, location, time, PW, usage, and tariff area. Additional exemplary conditions applicable to an outgoing call are: called party number and forwarded-to number. These conditions are explained hereinabove.

Some exemplary applications of and/or situations involving the extended CB service are explained below:

(1) The current GSM CB service options (e.g., 'Call Barring of All Outgoing Calls', 'Call Barring of All Outgoing International Calls', 'Call Barring of All Outgoing International Calls except towards Home PLMN Country', 'Call Barring of All Incoming Calls', and 'Call Barring of All Incoming Calls while Roaming outside Home PLMN', etc.) may be extended and made more flexible by contouring them by using them in conjunction with, e.g., usage, time, and PW conditions.

(2) A company provides cell phones to its employees, and company policy states that originating calls may not be placed outside company hours. To enforce this, the phones may have in effect an outgoing CB by time and/or PW feature.

(3) A company provides cell phones to its employees, and company policy states that originating calls may not be placed outside the company's area code. To enforce this, the phones may have in effect an outgoing CB by called party number feature.

(4) If a customer does not wish to receive calls from certain people, then the customer may use an incoming CB by CPN feature.

(5) If a subscriber does not wish to receive calls from any network besides the network in which the subscriber is currently roaming, then the subscriber may use an incoming CB by CPN and location feature.

(6) If a parent gives a cell phone to his/her child and only wants the child to be able to make calls to a certain set of numbers (e.g., in an emergency, to home, to work, etc.), then the parent may establish an outgoing CB by called party number and forwarded-to number feature.

(7) If a customer loans his/her phone to a friend, but the customer does not want the friend to make unlimited calls, then the customer may use a CB by usage feature.

(8) If a customer does not wish to send or receive calls while he/she is currently in a high tariff area (currently GSM specific), then the customer may effectuate a CB by tariff area feature.

Alteration of Subscription Information

In an additional aspect of the present invention, a subscriber may configure a logical expression such that when the selected conditions render the logical expression "TRUE", the targeted feature is modified, inhibited/ suppressed, turned "ON", etc. by, for example, altering the subscriber data. In one sense, subscriber data may be altered based on a previous transaction(s). Thus, this additional aspect can affect features across features In other words, the execution of one feature and the evaluation of a logical expression can impact other features in the future. For example, a logical expression may be established such that the making of a MPTY call triggers the inhibition of the CW SS, either in its entirety or in part.

Although preferred embodiment(s) of the method and system of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for enabling the control of execution of a feature in a telecommunications network, the method comprising the steps of:

receiving a plurality of parameters related to said feature;

detecting, by said telecommunications network, a call event corresponding to a subscriber;

determining whether said feature is turned on;

evaluating a logical expression, said logical expression including a plurality of variables, at least two of said plurality of variables associated with said plurality of parameters; and determining whether to execute said feature based, at least in part, on said step of evaluating a logical expression and said step of determining whether said feature is turned on.

2. The method according to claim 1, wherein said step of receiving a plurality of parameters related to said feature comprises the step of receiving said plurality of parameters via an Unstructured Supplementary Service Data procedure that is transmitted from a mobile station, said subscriber specifying said plurality of parameters using said mobile station.

3. The method according to claim 1, wherein said step of receiving a plurality of parameters related to said feature comprises the step of receiving said plurality of parameters via a network-transmitted message that originates from a computing device, said subscriber specifying said plurality of parameters using said computing device.

4. The method according to claim 1, wherein said step of determining whether said feature is turned on comprises the step of determining whether said feature is turned on when said call event is detected; and further comprising the step of:

bypassing, with respect to said feature, said steps of evaluating a logical expression and determining whether to execute said feature if said feature is not determined to be turned on in said step of determining whether said feature is turned on when said call event is detected.

5. The method according to claim 1, wherein said step of determining whether said feature is turned on comprises part of said step of evaluating a logical expression whereby said logical expression includes said plurality of variables and at least one additional variable associated with whether said feature is turned on.

6. The method according to claim 1, wherein said step of receiving a plurality of parameters related to said feature comprises the step of receiving said logical expression.

7. The method according to claim 6, wherein:

said logical expression comprises the form "((UNARY OPERATOR A) BOOLEAN OPERATION (UNARY OPERATOR B)) AND (ON/OFF)", where "A" and "B" comprise two of said plurality of variables that are associated with said plurality of parameters, "UNARY OPERATOR" is optional, and "ON/OFF" comprises a variable associated with whether said feature is turned on when said call event is detected.

8. The method according to claim 1, wherein said step of determining whether to execute said feature based, at least in part, on said step of evaluating a logical expression and said step of determining whether said feature is turned on comprises the step of determining to execute said feature when said logical expression is evaluated as true.

9. The method according to claim 1, wherein said feature comprises at least one of the call waiting, call forwarding, multi-party calling, and call barring features.

10. The method according to claim 1, wherein at least one parameter of said plurality of parameters comprises a stipulation related to at least one of calling party number, location, time, password, usage, tariff area, IP address, and called party number and forwarded-to number.

11. A system for enabling the control of execution of a feature in a telecommunications system, comprising:

a network, said network including subscriber information, wherein said network is capable of receiving a plurality of parameters related to said feature and storing said plurality of parameters as part of said subscriber information, and wherein said network is adapted to detect a call event corresponding to a subscriber; to determine whether said feature is turned on; to ascertain a result of a logical expression, said logical expression including a plurality of variables, at least two of said plurality of variables associated with said plurality of parameters; and to determine whether to execute said feature responsive, at least in part, to said result and to whether said feature is turned on; and a communication station of said subscriber, said communication station in communication with said network.

12. The system according to claim 11, wherein:

said communication station is a mobile station; and said plurality of parameters that are related to said feature are received via an Unstructured Supplementary Service Data procedure that is transmitted from said mobile station, whereby said subscriber specifies said plurality of parameters using said mobile station.

13. The system according to claim 11, further comprising:

a remote computing device in communication with said network;

wherein said plurality of parameters that are related to said feature are received via the Internet in a message that originates from said remote computing device, whereby said subscriber specifies said plurality of parameters using said remote computing device.

14. The system according to claim 11, wherein said network is further adapted to determine whether said feature is turned on when said call event is detected by said network and to discontinue analysis of said feature if said feature is determined to not be turned on when said call event is detected.

15. The system according to claim 11, wherein said network is further adapted to determine whether said feature is turned on via the ascertainment of said result of said logical expression, said logical expression including said plurality of variables and at least one additional variable associated with whether said feature is turned on.

16. The system according to claim 11, wherein said network is further capable of receiving said logical expression and storing said logical expression as part of said subscriber information.

17. The system according to claim 16, wherein:

said logical expression comprises the form "( (UNARY OPERATOR A) BOOLEAN OPERATION (UNARY OPERATOR B)) AND (ON/OFF)", where "A" and "B" comprise two of said plurality of variables that are associated with said plurality of parameters, "UNARY OPERATOR" is optional, and "ON/OFF" comprises a variable associated with whether said feature is turned on when said call event is detected.

18. The system according to claim 11, wherein said network is further adapted to compare at least one parameter of said plurality of parameters to at least one observed actual condition when ascertaining said result of said logical expression, and said network determines to execute said feature responsive to, at least in part, an ascertainment that said result is true.

19. The system according to claim 11, wherein said feature comprises at least one of the call waiting, call forwarding, multi-party calling, and call barring features.

20. The system according to claim 11, wherein at least one parameter of said plurality of parameters comprises a stipulation related to at least one of calling party number, location, time, password, usage, tariff area, IP address, and called party number and forwarded-to number.

21. A method for enabling the control of execution of a feature in a telecommunications system, the method comprising the steps of:

receiving a plurality of parameters related to said feature and an indication as to whether said feature is to be on;

detecting, by said telecommunications system, a call event corresponding to a subscriber;

evaluating a multivariate logical expression if said call event is detected in said step of detecting, said multivariate logical expression including at least three variables, said at least three variables associated with said plurality of parameters and said indication as to whether said feature is to be on; and determining whether to execute said feature based, at least in part, on said step of evaluating a multivariate logical expression.

22. A method for enabling the control of alteration of subscriber information in a telecommunications system, the method comprising the steps of:

receiving at least one parameter related to a feature;

detecting, by said telecommunications system, a call event corresponding to a subscriber;

evaluating a logical expression if said call event is detected in said step of detecting, said logical expression including at least one variable, said at least one variable associated with said at least one parameter; and determining whether to alter said subscriber information in relation to said feature based, at least in part, on said step of evaluating a logical expression.

* * * * *

UNITED STATES PATENT AND TRADEMARK OFFICE
CERTIFICATE OF CORRECTION

PATENT NO.    : 6,295,447 B1
DATED         : September 25, 2001
INVENTOR(S)   : Martin Reichelt et al.

It is certified that error appears in the above-identified patent and that said Letters Patent is hereby corrected as shown below:

Column 1,
Line 5, before "DESCRIPTION OF RELATED ART" insert:
--                    Technical Field of Invention
The present invention relates in general to the field of telecommunications, and in particular, to a method and system for providing extended and/or programmable features (such as supplementary services (Sss)) to subscribers of telecommunications services. --

Signed and Sealed this

Twenty-sixth Day of August, 2003

JAMES E. ROGAN
*Director of the United States Patent and Trademark Office*